United States Patent [19]

Hollingsworth

[11] Patent Number: 5,262,706
[45] Date of Patent: Nov. 16, 1993

[54] MULTIFUNCTIONAL POWER DRIVEN POSITIONING TOOL SYSTEM

[76] Inventor: Lyndol W. Hollingsworth, 1309 August Dr., Austin, Tex. 78753

[21] Appl. No.: 895,736

[22] Filed: Jun. 9, 1992

[51] Int. Cl.⁵ .............................. B66F 3/22
[52] U.S. Cl. ........................ 318/560; 74/424.8 R; 414/462; 254/126; 254/8 B; 318/640
[58] Field of Search ............... 318/560–696; 254/98, 8 B, 122, 89 H, 126, 10 S, DIG. 2; 74/89.15, 89.13, 424.8 R; 414/462, 347, 522, 347; 187/18

[56] References Cited

U.S. PATENT DOCUMENTS

| | | | |
|---|---|---|---|
| 3,237,921 | 3/1963 | Jay | 74/424.8 R |
| 3,286,542 | 8/1963 | Jay | 74/424.8 R |
| 3,606,252 | 7/1969 | Dorough. | |
| 4,085,624 | 4/1978 | Nomura | 74/89.15 |
| 4,100,850 | 7/1978 | Wolbrink et al. | 74/89.15 |
| 4,872,230 | 10/1989 | Levine | 254/126 X |
| 4,915,573 | 4/1990 | Wapner et al. | 414/540 |
| 4,919,392 | 4/1990 | Minuto | 254/126 |
| 4,941,797 | 7/1990 | Smillie | 414/462 |
| 4,943,034 | 7/1990 | Wagnon | 254/122 |
| 4,984,657 | 1/1991 | Burns | 74/424.8 R |
| 4,995,278 | 2/1991 | Huang | 74/89.15 |
| 5,050,844 | 9/1991 | Hawk | 254/89 H |
| 5,065,983 | 11/1991 | Slay | 254/8 B |
| 5,085,407 | 2/1992 | Lonon | 254/103 |
| 5,135,205 | 8/1992 | Bedard | 269/17 |
| 5,183,235 | 2/1993 | Arzouman et al. | 254/8 B |

*Primary Examiner*—Paul Ip
*Attorney, Agent, or Firm*—Joseph F. Long

[57] ABSTRACT

A multifunctional power driven positioning tool system wherein a battery powered screw driven removable central unit may be fitted into equipment to function as a tool for prying apart objects, for lifting or lowering within adjustable calibrated distances, for powering a material handling unit and for use in a press frame for pressing and pulling bearings.

4 Claims, 8 Drawing Sheets

MULTIFUNCTIONAL POWER DRIVEN POSITIONING TOOL SYSTEM

BACKGROUND OF THE INVENTION

There is a need for light weight portable power driven positioning device that will maintain desired position until power is applied to reposition the load.

There have been serious accidents to mechanics working with automobiles because of sudden fall of hydraulically operated jacks. One of the objectives of the present invention is to replace hydraulic jacks which frequently are manually operated with a power driven jack that must be power driven to change positions.

Other objectives include:
a) having a light manually portable unit that may be battery driven that will provide spreading and compressing power and hold in a fixed position;
b) having a unit that will reach a predetermined and manually resettable limit both when the unit is contracting and when the unit is extending;
c) having a unit that will maintain a position even when loaded until power is applied to move the position;
d) having a unit with a top attachment connector means and a bottom connector means thereby allowing use of a variety of attachments to make the unit functional for uses such as: pulling a bearing, pulling pipe together, prying metals apart or prying doors open in cases such as an automobile wreck, lifting special objects such as an automobile engine, mounting in a dolly or jack base to allow manipulation for lifting such as lifting a frame of a car.
e) having a low cost device removably useable to power a manually moveable materials handling unit.

Many other uses may be visualized wherein attachments to the base plate and upper plate of the unit allow use for lifting, pulling, spreading, compressing, etc. Our unit comprises a central unit, battery power driver and controlled with easily attached accessories, fittings, or plates to fulfill all the outlined objects.

SUMMARY OF THE INVENTION

The preferred embodiment of the invention encompasses a central unit that may be interchangeably fitted with multiple accessories to perform multiple different functions. The central unit is fitted with carrying handles, a reversing motor, a gearbox, and threaded drive screws to collapse or extend a quadrilateral arrangement of pivotally connected metal bars thereby changing the position of upper spacer bars which are connected to a plate or fitting relative to lower spacer bars which are also connected to a plate or fitting. The central unit when used as a special purpose jack has the lower spacer bars removably locked into a base plate and the upper spacer bars removably locked into a lifting plate with an internally threaded opening to removably secure specially shaped holding fittings such as may be used to lift an engine, to lift a transmission of a car, etc. A threaded extension fitting may be used for initial positioning of the holding fittings relative to the base.

In a preferred embodiment, a reversing D.C. motor is used to power the unit from a 12 volt battery. The unit is provided with upper and lower limit switches with adjustable trip mechanisms to automatically stop the movement at a desired lowest position or desired highest position. Calibration marks are provided to allow precise settings of these limit switches.

In another use extension arms are clamped to the upper and lower spacer rods. An internally threaded opening in the ends of the extension arms allow use of various special fittings. When fitted with specially shaped sharpened fittings the unit may be used for prying apart objects such as prying open doors on a wrecked car. When fitted with special hooks, the unit may be used for such purposes as holding metals together for welding or pulling together of large pipe joints for bolting, etc.

In another use, the unit may be removably installed in a press frame and used for pressing or pulling internal bearings.

In still another use, the unit is removably mounted in a frame to power a moveable materials handling unit.

BRIEF DESCRIPTION OF THE DRAWINGS

FIG. 3a shows threaded openings to receive fittings on the ends of the extension arms, FIG. 3B.

FIG. 4b and FIG. 4c, show special fittings while FIG. 4a shows an extension for initial positioning of the special fitting.

DETAILED DESCRIPTION OF THE INVENTION

The preferred embodiment of the invention may best be described from the drawings.

Figure 1:
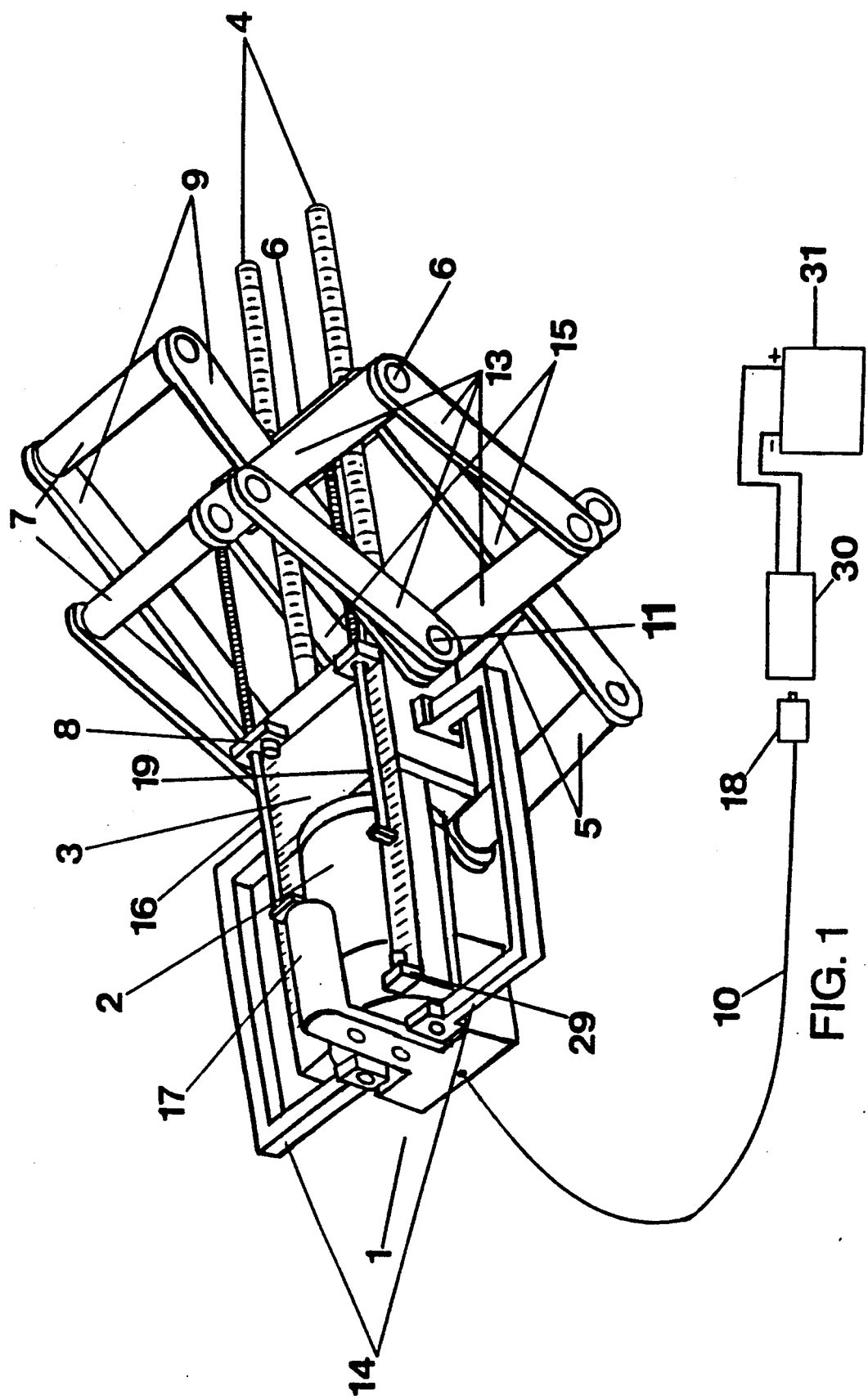
FIG. 1 shows the power unit 1 of a multifunctional tool system.

In FIG. 1 we show the central power unit 1 comprising a reversible D.C. motor 2 driving gears in a gearbox 3 to turn drive screws 4. Through connector 18 the motor may be plugged into a control box 30 connected with a battery 31 or other source of power such as A.C. with a rectifier. A light 17 may be activated from the control box 30 or a local switch (not shown). The motor 2 is rigidly attached to the gearbox 3 with carrying handles 14. The threaded drive rods 4 are threadably attached to a middle spacer rod 6, as shown in more detail in FIG. 2. When lower spacer rods 5 and upper spacer rods 7 are rigidly clamped to a base plate and lifting plate or other special attachments as shown in FIGS. 3, 4, 5 and 6, the base plate and lifting plate are positionally adjusted by movement of middle spacer rod 6 along the threads of the drive rods 4. This occurs through cooperation of one set on each side of the unit of bars 13 pivotally connected in a quadrilateral arrangement with one midpoint pivotally connected, on each end to middle spacer rod 6 and the other midpoint attached at mounting pin 11 extending from gearbox 3. A top point of each set of the quadrilateral connected bars 13 connect at each end of the same upper spacer rod 7 and a bottom point of each connects at each end of a lower spacer rod 5. Upper drive bars 9 on each side of the unit connect on one end to a second upper spacer rod 7 and on the other end to connector pins 11 that are rigidly attached to gearbox 3. Lower drive bars 15 on each side of the unit connect at one end to the midpoint of the quadrilateral arrangement and on the other end to a second spacer rod 5. From inspection we see that with spacer rods 5 on the lower side and spacer rods 7 on the upper side rigidly fastened to plates or other attachments, the plates or other attachments will move further apart when reversing motor 2 is activated to turn threaded drive screws 4 to pull spacer rod 6 toward gearbox 3 (see also FIG. 2) and will move closer together with interaction of flat bars 13, lower drive arm 15, upper drive arm 9 and spacer rod connections when motor 2 is activated to push spacer rod 6 away from gearbox 3. With threads of a small pitch on drive rods 4 and multiple gears in gearbox 3 connected to motor 2 friction will hold the unit in a fixed position until motor 2 is activated. For gearing simplicity, drive rods 4 may be threaded in opposite directions from each other.

Figure 2:
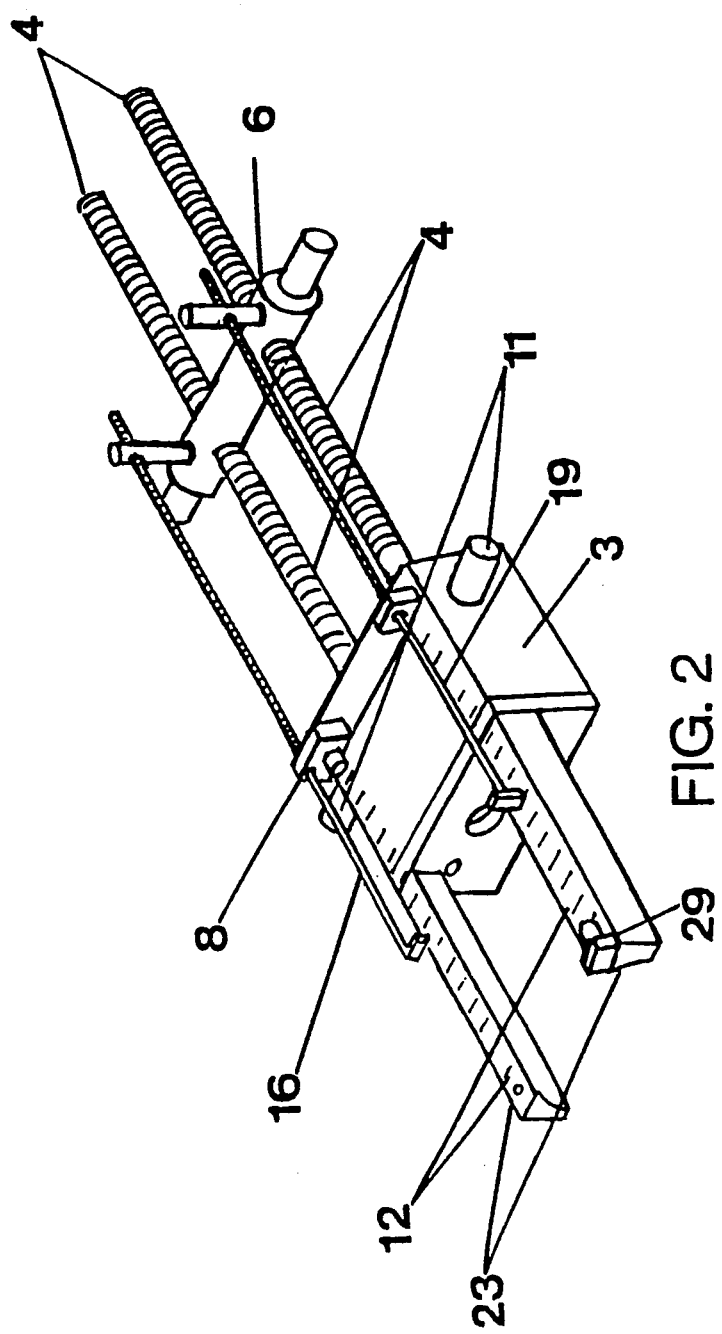
FIG. 2 shows an internal part in more detail of the power unit as shown in FIG. 1.

In FIG. 2 we show more clearly some parts of the central unit 1, FIG. 1. In FIG. 2 motor mount arms 23 are integrally attached to gearbox 3. Calibration marks 12 are available to allow a user to reproducibly adjust to desired position threaded rod 16 to interact with lower limit switch 8 to set a lower limit of travel of the top plate or connection in central unit 1, FIG. 1. In the same way, a user may use calibration marks 12 under adjustment rod 19 to adjust rod 19 to limit upward travel at a desired position by interaction of the end of rod 19 and upper limit switch 9. Also shown is a mounting pin 11 on each side of gearbox 3. The midpoints of the quadrilateral arrangement of bars 13, FIG. 1, connect to mounting pins 11 and both ends of spacer rod 6 as previously discussed.

Figure 3:
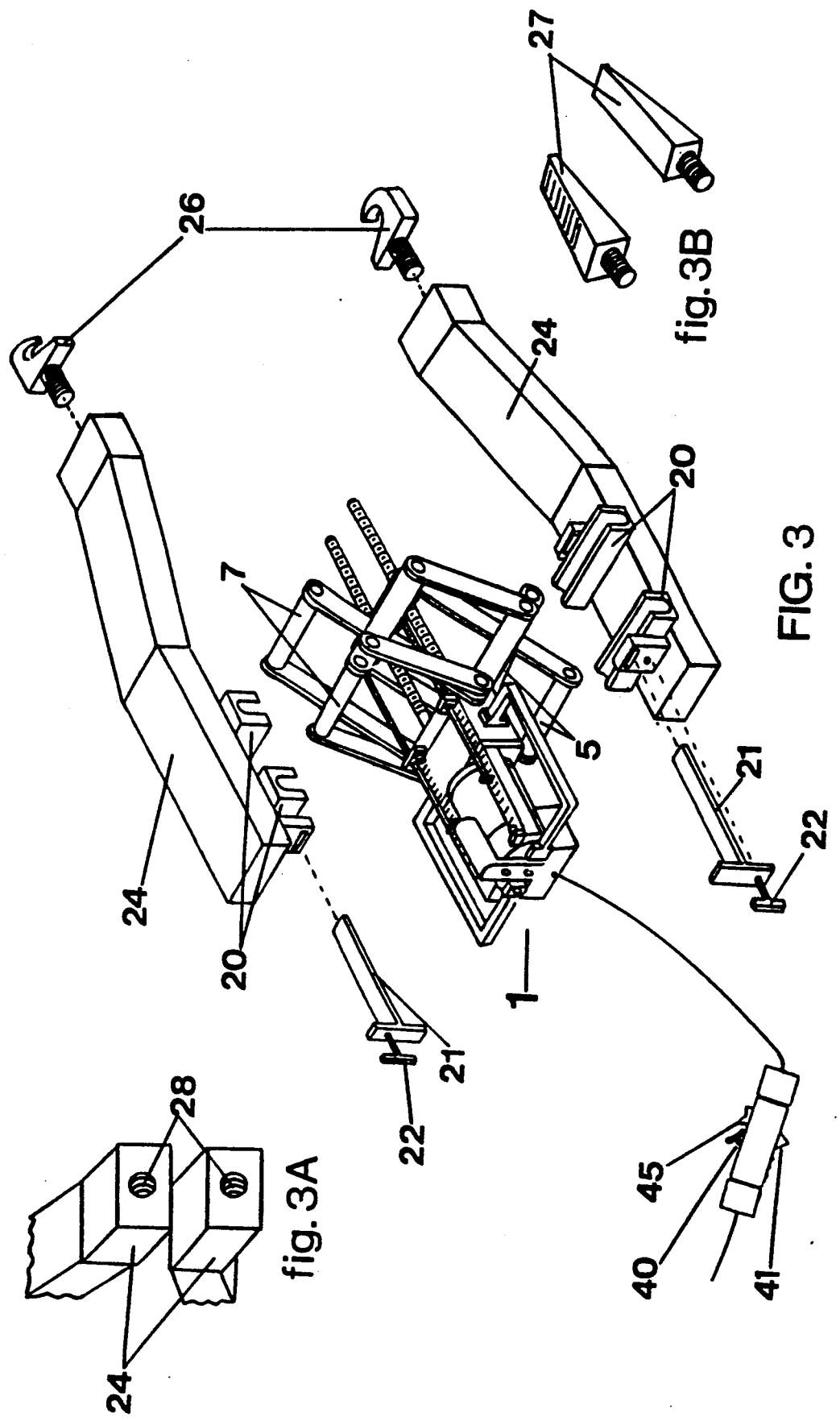
FIG. 3 shows the power unit 1 removably clamped to extension arms with special purpose fittings for the extension arms.

In FIG. 3 we show an exploded view indicating one way that upper spacer rods 7 and lower spacer rods 5 of central unit 1 may be attached to upper and lower extension arms 24 using clamps 20 rigidly attached to the extension arms 24. Clamp fastener bars 21 may be manually inserted and locked into place with thumbscrews 22. In FIG. 3A we show an end view of extension arms 24 with threaded holes 28 to receive threaded fittings 26 and 27, FIG. 3B. Many other special end fittings may be visualized. Fittings 27 were designed for use of the unit in prying apart objects and fittings 26 were designed for operation with a rope or cable.

Figure 4:
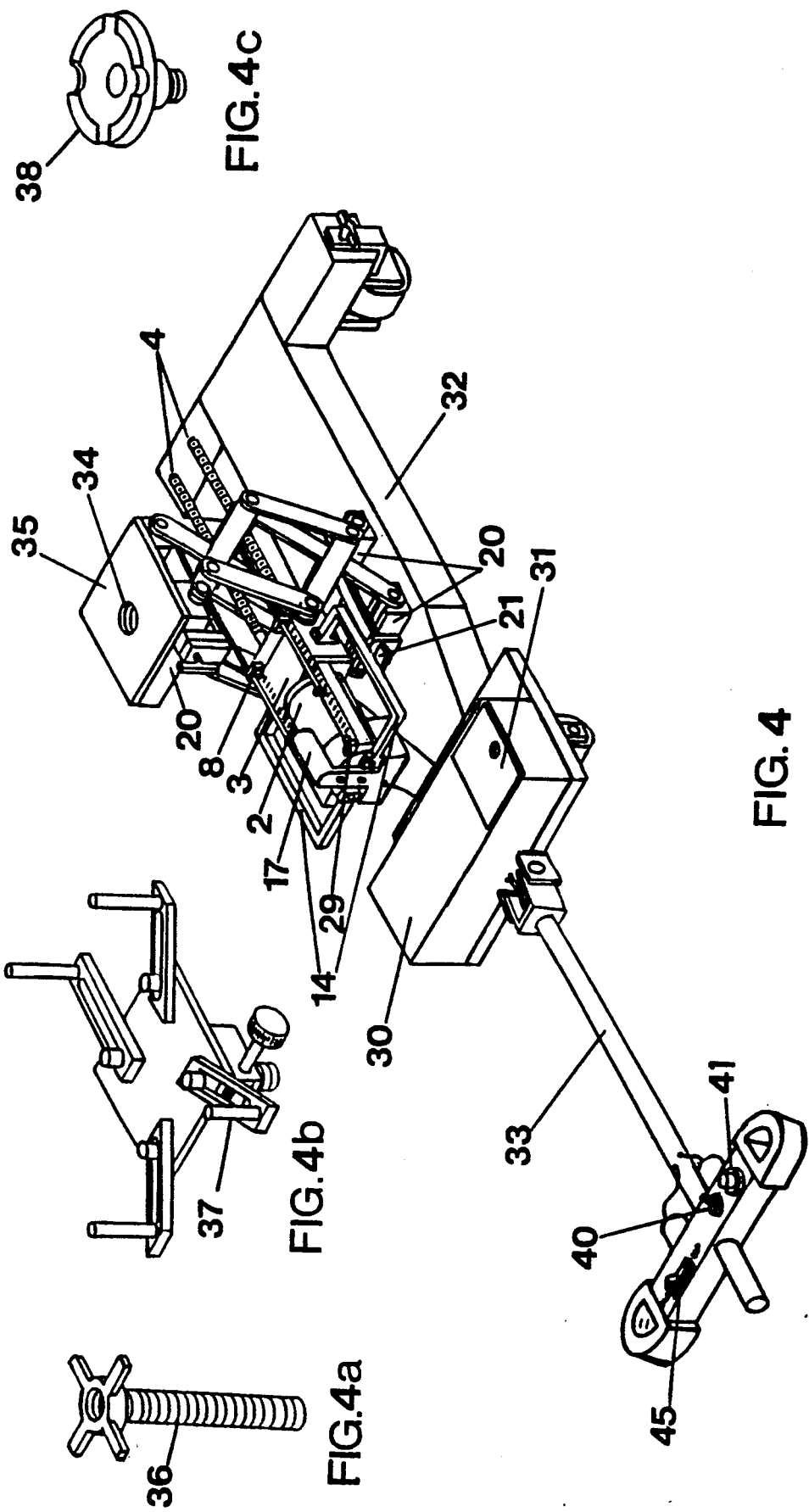
FIG. 4 shows the unit mounted in a movable base for use as a special purposes jack with special fittings.

In FIG. 4 we show the central unit locked with clamp bar 21 into clamps 20 which are rigidly attached to jack mounting base plate 32 of a manually movable jack. An upper lifting plate 35 with a threaded opening 34 is similarly locked in place with clamps 20 integrally attached to lifting plate 35. Lifting plate 35 also serves to hold special fittings such as 36, 37 and 38 that may be thread into threaded opening 34. Extension fitting 36, FIG. 4a, may be used directly for positioning a load or serve to hold fittings such as 38, FIG. 4c, which is specially designed for lifting a motor or 37, FIG. 4b, which is specially designed to lift a transmission. With arms integrally attached, extension fitting 36 allows manual positioning of special fittings to minimize jack travel. In this unit control wires lead from electrical circuitry 30 through the handle 33 to a light switch 40 and up/down control switch 45 and a motor on/off switch 41.

Figure 5:
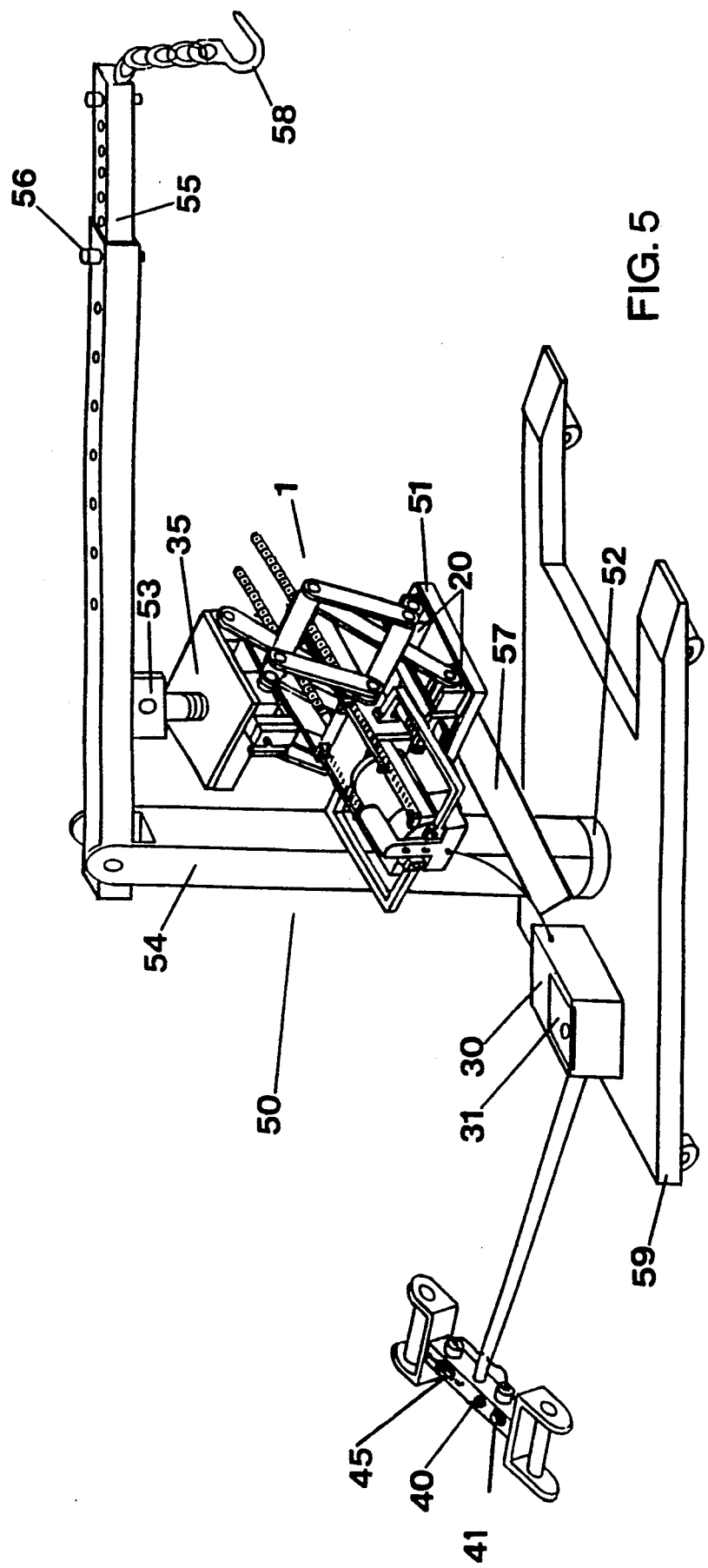
FIG. 5 shows the unit mounted to power a movable materials handling unit.

In FIG. 5 we show unit 1 mounted in a movable material handing unit 50 that would serve many purposes including handling large tires and drums with hook 58 and a choker. The control unit 1 is rigidly clamped with clamps 20 on a pivotal base 51 that is integrally attached as shown to upright post 54. A pivotal connector 53 is threaded into lifting plate 35 and may be connected by a pin 56 to the pivotally mounted extension arm 55. The unit 1 may then be used for positioning the extension 55 and fittings such as hook 58 which may be used for lifting. Upright post 54 has a pivotal mount 52 to allow easy positioning of the extension arm 55. Extension arm 55 may be pinned to a fixed length with pin 56.

Figure 6:
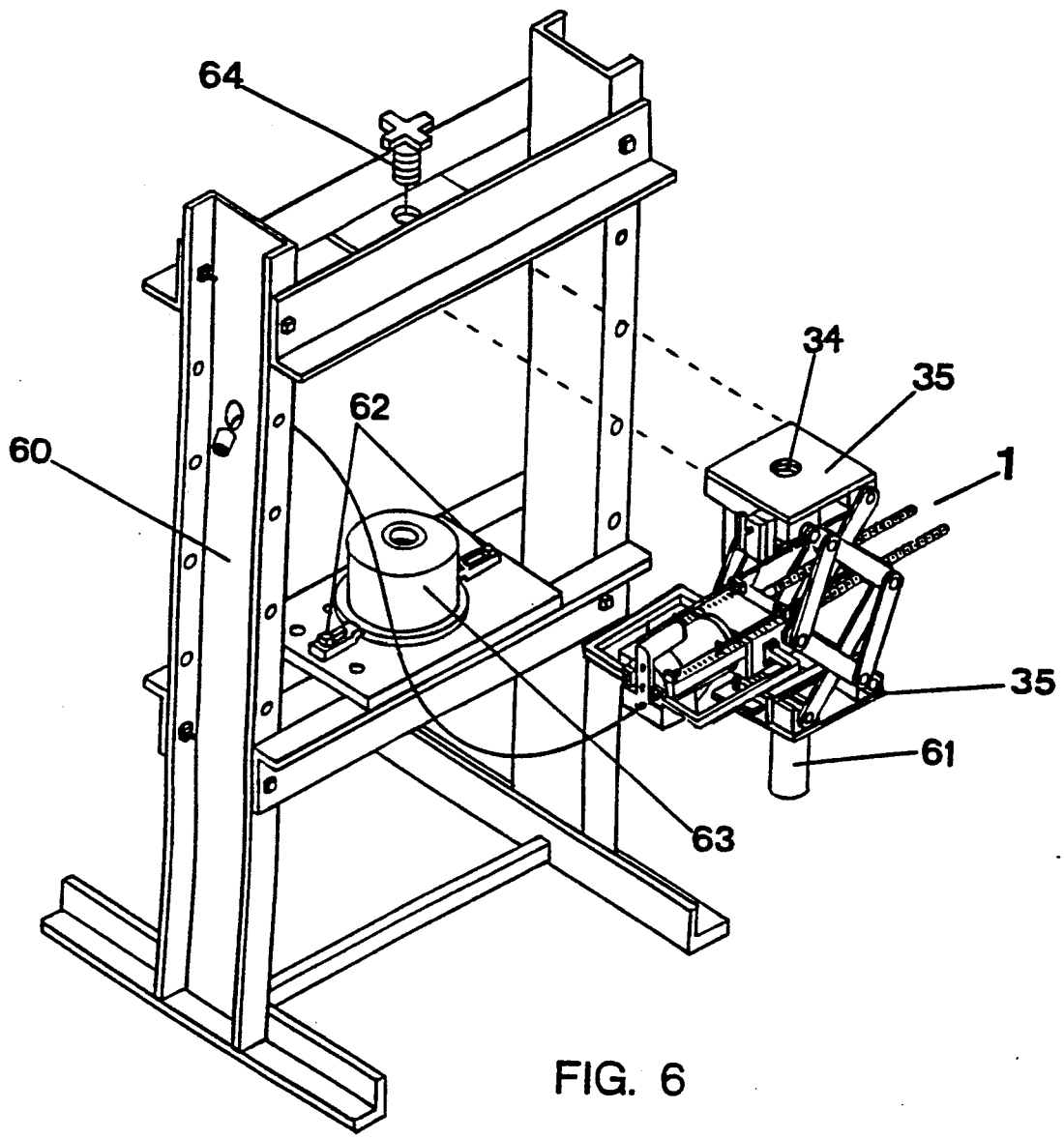
FIG. 6 shows the unit with a bearing pressing fitting as the unit would be equipped for this use to mount to a press frame.

In FIG. 6 we show unit 1 positioned to be connected in frame 60 with connector 64 and clamped into the lifting plate 35 on the top side and a second lifting plate 35 on the lower side. Fitting 61 is designed for pressing bearings and could be replaced with another fitting and used in press frame 60, FIG. 7 for pulling internal bearings. Other similar uses with special fittings are visualized.

Figure 7:
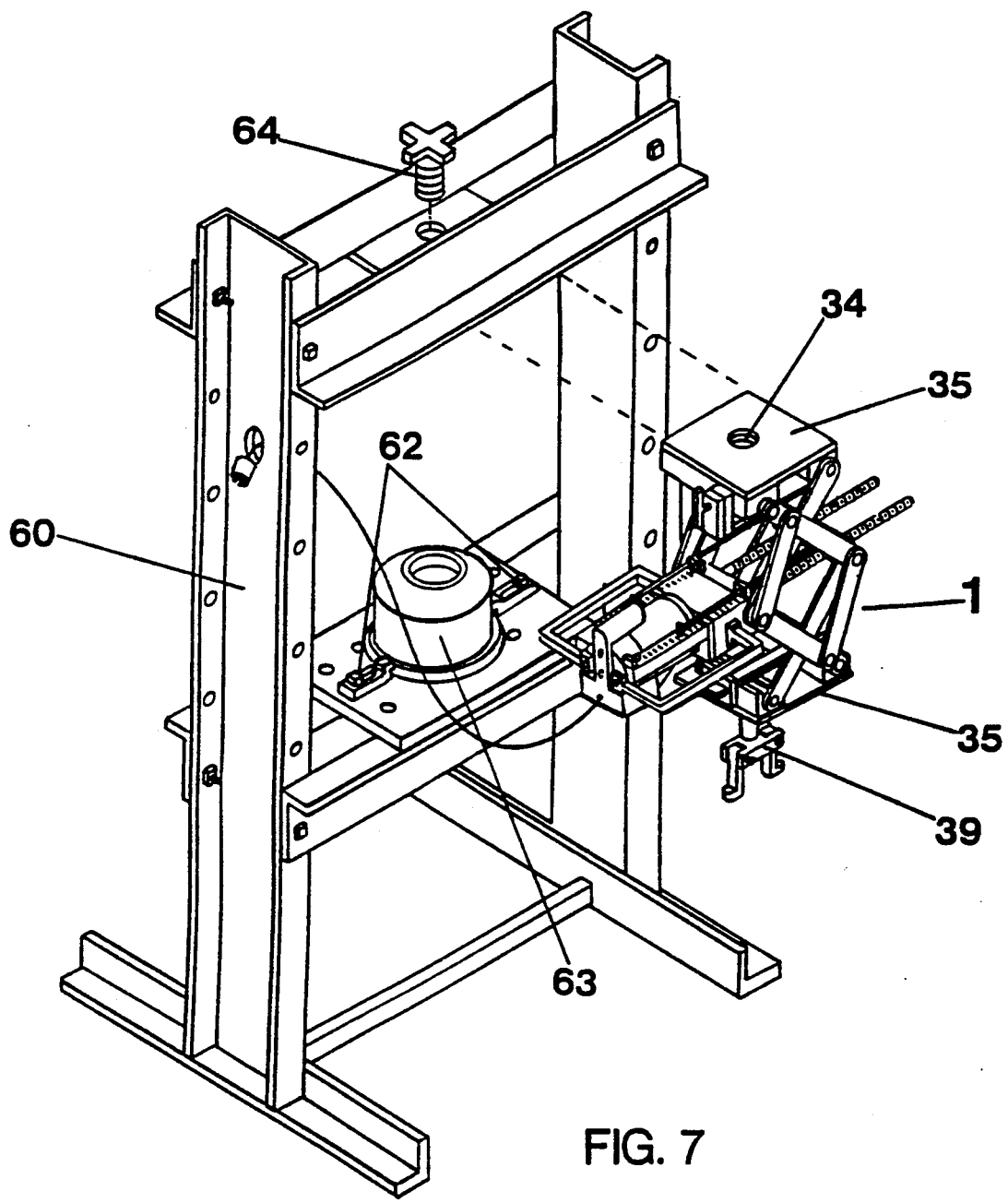
FIG. 7 shows the press frame and Unit 1 equipped to pull internal bearings.

In FIG. 7 we show the press frame 60 as shown in FIG. 6 with unit 1 equipped with an internal bearing puller 39. Threaded connector 64 which would normally be a minimum of ½" in diameter is sized to fit opening 34 in plate 35 and may be used to fasten unit 1 firmly in place in press frame 60. We've shown a bearing housing 63 with hold down clamps 62 to hold bearing housing 63 in place. When in position in press frame 60 and equipped with internal bearing puller fitting 39 unit 1 may then be used for pulling a bearing. This use is illustrative of another use of the unit in a press frame.

Figure 8:
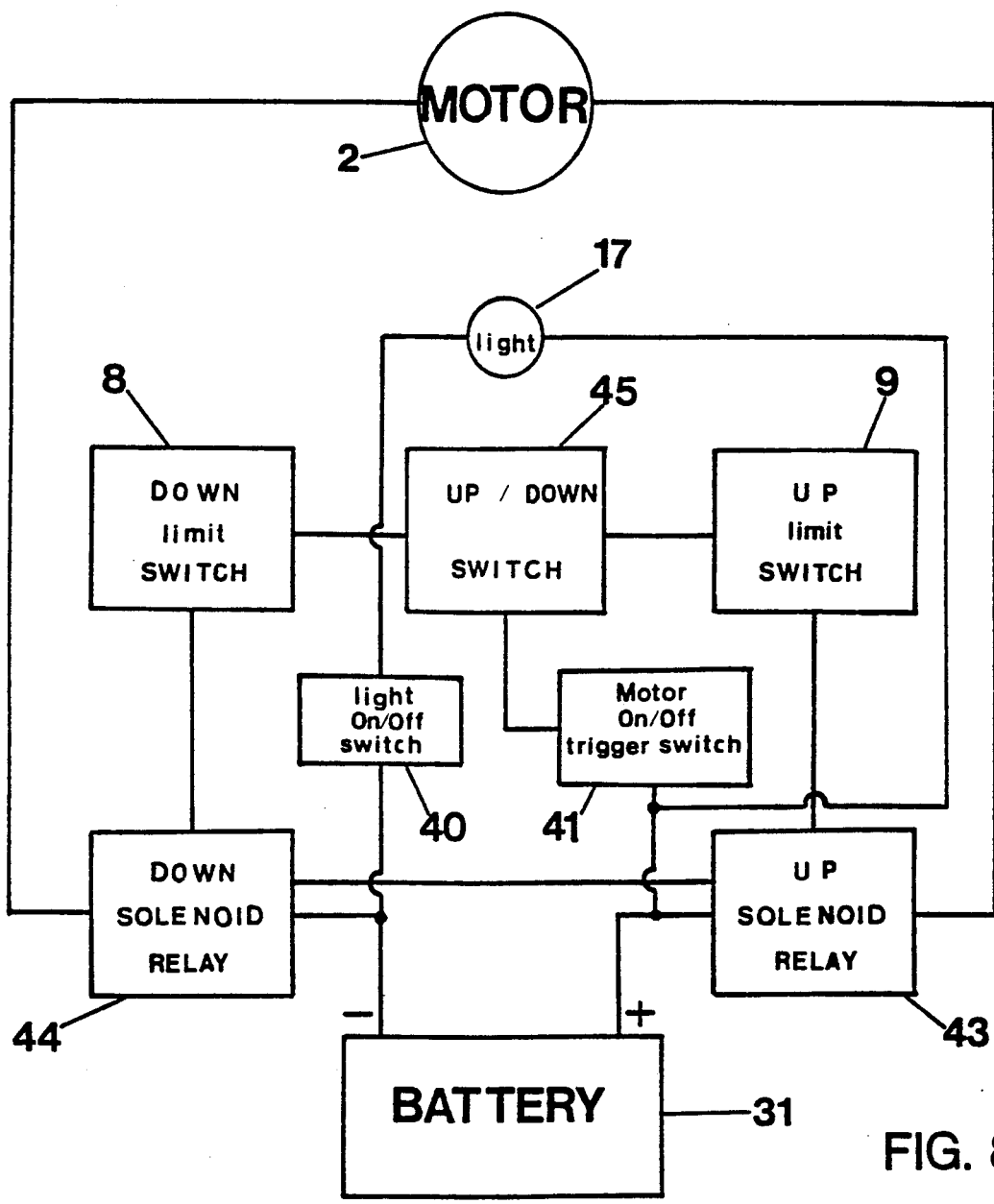
FIG. 8 shows a simplified wiring diagram.

In FIG. 8 we show a simplified wiring diagram for unit 1, FIG. 1. A D.C. reversing type motor 2 is powered from a battery 31 through either solenoid 43 or solenoid 44. With motor switch 41 in a closed position and control switch 45 in a down position current flow from battery 31 to downward limit switch 8 and if switch 8 is in a closed position the solenoid 44 which will activate reversing motor 2 to operate control unit 1, FIG. 1, to pull the spacer rods which are mounted to a base plate and/or accessories, closer together. Similarly with motor switch 41 in an "on" position and switch 45 in an "up" position current will flow from battery 31 through the normally closed upward limit switch 9 to solenoid 43 to actuate motor 2 to drive central unit 1 to move spacer rods that are clamped to plates or accessories to move further apart until either control switch 45 is moved to an off position or limit switch 9 is opened by a mechanical trip as shown in FIG. 1.

What is claimed is:

1. A multifunctional power driven positioning device comprising:
 a) a battery;
 b) a reversible motor powered by said battery;
 c) two upper spacer rods, two lower spacer rods, a removable base; a first connector means, an upper attachment connector means and a mechanical driven means driven by said motor; said first connector means removably and pivotally attaching said two lower spacer rods to said removable base; said upper attachment connector means removable and pivotally attaching said two upper spacer rods to a means to hold said two upper spacer rods a fixed distance apart relative to each other and said mechanical drive means acting to vary the distance between said two upper spacer rods and said two lower spacer rods; said mechanical drive means further comprising:

1) a first group of four bars pivotally connected to form a variable height quadrilateral arrangement pivotally connected at a top of said quadrilateral arrangement to a fist end of a first one of said two upper spacer rods and a bottom end of said quadrilateral arrangement pivotally connected to a first end of a first one of said two lower spacer rods;

2) a second group of four bars pivotally connected to form a second variable height arrangement pivotally connected at a top of said second arrangement to a second end of said first one of said two upper spacer rods and connected at a bottom end of said second arrangement to a second end of said first one of said two lower spacer rods;

3) a first upper drive arm pivotally connected at a first end to a first end of a second of said two upper spacer rods and pivotally connected at a second end to a midpoint of said first arrangement; a second upper drive arm pivotally connected at a first end to a second end of said second of said two upper spacer rods and pivotally connected of a second end to a mid-point of said second arrangement;

4) a first lower drive arm pivotally connected at a first end to a first end of a second of said two lower spacer rods and pivotally connected at a second end to a midpoint of said second arrangement; a second lower drive arm pivotally connected at a first end to a second end of second of said two lower spacer rods and pivotally connected at a second end to a midpoint of said second arrangement;

5) a gearbox and a middle spacer rod, said middle spacer rod being pivotally connected between a first midpoint of said first and said second quadrilateral arrangement; and projections on said gearbox being pivotally connected between second midpoints of said first and said second arrangement;

6) a first and second threaded drive screw, dual limit switch means, and said gearbox cooperating with said motor and said middle spacer rods to vary the distance between said removable base and said upper attachment connector means to preset limits.

2. A multifunctional power driven positioning device as in claim 1 wherein said limit switch means are mounted to be mechanically operated by movement of threaded rods, said rods being adjustable to set an upward limit and a downward limit of travel of said base relative to said upper attachment connector means.

3. A multifunctional power driven positioning device as in claim 1 wherein said upper spacer rods are removably clamped to said upper attachment connector means and said lower spacer rods are removably clamped to said base.

4. A multifunctional power driven positioning device as in claim 1 wherein said upper two spacer rods are removably attached to a first extension arm and said lower two spacer rods are removably attached to a second extension arm with both of said extension arms containing threadable opening means to threadably attach special purpose mechanical fitting means to allow said positioning device to be used for spreading, compressing, prying apart, and pulling together of objects.

* * * * *